United States Patent
You et al.

(10) Patent No.: US 7,646,552 B2
(45) Date of Patent: Jan. 12, 2010

(54) SUBMINIATURE IMAGING OPTICAL SYSTEM

(75) Inventors: Ho Sik You, Gyunggi-do (KR); Sun Jun Hwang, Gyunggi-do (KR); Phil Ho Jung, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 12/078,575

(22) Filed: Apr. 1, 2008

(65) Prior Publication Data
US 2009/0109552 A1 Apr. 30, 2009

(30) Foreign Application Priority Data
Oct. 30, 2007 (KR) .................... 10-2007-0109848

(51) Int. Cl.
*G02B 9/34* (2006.01)
(52) U.S. Cl. ..................................... 359/772; 359/771
(58) Field of Classification Search ................ 359/755, 359/756, 757, 763, 764, 771, 772
See application file for complete search history.

(56) References Cited

U.S. PATENT DOCUMENTS

| 5,808,815 | A | 9/1998 | Kouthoofd | |
| 6,441,971 | B2 * | 8/2002 | Ning | 359/739 |
| 7,466,497 | B2 * | 12/2008 | Park et al. | 359/715 |

OTHER PUBLICATIONS

German Office Action issued on May 7, 2009 in corresponding German Patent Application 102008016877.7.

* cited by examiner

*Primary Examiner*—Darryl J Collins (57) ABSTRACT

There is provided a subminiature imaging optical system suitably applicable to a subminiature optical device such as a mobile phone camera. The subminiature imaging optical system including: a first lens having positive refractive power and both convex surfaces; a second lens having negative refractive power and a concave image-side surface; a third lens having negative refractive power and a meniscus shape with a convex image-side surface; and a fourth lens having negative refractive power.

12 Claims, 6 Drawing Sheets

SUBMINIATURE IMAGING OPTICAL SYSTEM

CROSS-REFERENCE TO RELATED APPLICATIONS

This application claims the priority of Korean Patent Application No. 2007-0109848 filed on Oct. 30, 2007, in the Korean Intellectual Property Office, the disclosure of which is incorporated herein by reference.

BACKGROUND OF THE INVENTION

1. Field of the Invention

The present invention relates to a subminiature imaging optical system, and more particularly, to a subminiature imaging optical system installed in a mobile communication terminal and a personal digital assistant (PDA) or utilized in a surveillance camera and a digital camera.

2. Description of the Related Art

In general, mobile communication terminals had only functions of basic communication at their incipient stage. However, with increased use, the mobile communication terminals are required to have diversified functions ranging from photographing to image transmission and video communication, continuously evolving in their functions and services. Recently, a new expanded concept of mobile communication terminal by integrating digital camera technology with mobile phone technology, i.e., so called camera phones or camera mobile phones are significantly attracting attention. Further, a digital camcorder technology has been integrated with a mobile phone technology to develop a camcorder mobile phone or camcorder phone capable of storing and transmitting a live image running for several minutes or more.

Of late, a camera installed on the mobile phone should perform like an electronic still camera, while being required to be miniaturized, light-weight and low-cost. An image sensor such as a charge coupled device (CCD) or a complementary metal oxide semiconductor (CMOS) is reduced in pixel size thereof but increased in size itself. Thus, the imaging optical system employing such an image sensor needs to be high in resolution.

In order to satisfy miniaturization and low cost, the imaging optical system mounted on a camera of a mobile phone and a personal computer needs to have lenses of as small a number as possible, but this restricts a degree of freedom in designing and undermines the optical capabilities.

Therefore, there is required an imaging optical system which can be subminiaturized while achieving high resolution.

SUMMARY OF THE INVENTION

An aspect of the present invention provides a subminiature imaging optical system suitably applicable to a subminiature imaging optical device such as a mobile phone camera and a personal computer camera utilizing an image sensor such as a CCD or CMOS.

An aspect of the present invention also provides a subminiature imaging optical system which can achieve high resolution and is improved in various aberrations.

An aspect of the present invention also provides a subminiature imaging optical system which is increased in a back focal length to be easily installed in an optical instrument.

An aspect of the present invention also provides a subminiature imaging optical system which employs a number of plastic lenses to reduce weight thereof and can be easily manufactured in mass-production at a low cost.

An aspect of the present invention also provides a subminiature imaging optical system which adopts an aspherical lens to attain high resolution and various optical properties.

According to an aspect of the present invention, there is provided a subminiature imaging optical system including: a first lens having positive refractive power and both convex surfaces; a second lens having negative refractive power and a concave image-side surface; a third lens having negative refractive power and a meniscus shape with a convex image-side surface; and a fourth lens having negative refractive power.

The first lens may have refractive power satisfying following condition 1 and may have a dimension in an optical direction satisfying following condition 2, $$0.5 < f1/f < 0.7 \quad \text{condition 1,}$$

$$1.0 < TL/f < 1.3 \quad \text{condition 2,}$$

where f1 is a focal length of the first lens, f is an effective focal length of an overall optical system and TL is a distance from an object-side surface of the first lens to an image plane.

The first lens may have the object-side surface shaped to satisfy following condition 3, $$0.35 < r1/f < 0.55 \quad \text{condition 3,}$$

where r1 is a radius of curvature of the object-side surface of the first lens.

The first to third lenses may have respective Abbe numbers satisfying following conditions 4 to 6, $$25 < v1 - v2 < 40 \quad \text{condition 4,}$$

$$25 < v1 - v3 < 40 \quad \text{condition 5,}$$

$$-5 < v3 - v2 < 15 \quad \text{condition 6,}$$

where v1 is the Abbe number of the first lens, v2 is the Abbe number of the second lens and v3 is an Abbe number of the third lens.

The third lens may have refractive power satisfying following condition 7 and has an object-side surface shaped to satisfy following condition 8, $$10 < |f3|/f \quad \text{condition 7,}$$

$$0.2 < |r5|/f < 5 \quad \text{condition 8,}$$

where f3 is a focal length of the third lens (f3<0), and r5 is a radius of curvature of the object-side surface of the third lens (r5<0)

The fourth lens may have refractive power satisfying following condition 9, and may have an object-side surface of the fourth lens shaped to satisfy following condition 10, and an image-side surface shaped to satisfy following condition 11, $$2 < |f4|/f \quad \text{condition 9,}$$

$$0.2 < |r7|/f < 0.7 \quad \text{condition 10,}$$

$$0.2 < r8/f < 25 \quad \text{condition 11,}$$

where f4 is a focal length of the fourth lens (f4<0), r7 is a radius of curvature of the object-side surface of the fourth lens, and r8 is a radius of curvature of the image-side surface of the fourth lens.

The first lens may be formed of one of glass and plastic, and the second to fourth lenses are formed of plastic.

Each of the first to third lenses may have at least one refractive surface formed of an aspherical surface.

According to another aspect of the present invention, there is provided a subminiature imaging optical system including: a first lens having positive refractive power; a second lens having negative refractive power; a third lens having negative refractive power; and a fourth lens having negative refractive power, wherein the first lens has refractive power satisfying following condition 1 and a dimension in an optical axis direction satisfying following condition 2, has an object-side surface shaped to satisfy following condition 3, $0.5 < f1/f < 0.7$             condition 1, $1.0 < TL/f < 1.3$             condition 2, $0.35 < r1/f < 0.55$            condition 3, where f1 is a focal length of the first lens, f is an effective focal length of an overall optical system, and TL is a distance from the object-side surface of the first lens to an image plane.

The first, lens may have both convex surfaces, the second lens may have a concave image-side surface and the third lens may have a meniscus shape with a convex image-side surface.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figure 1:
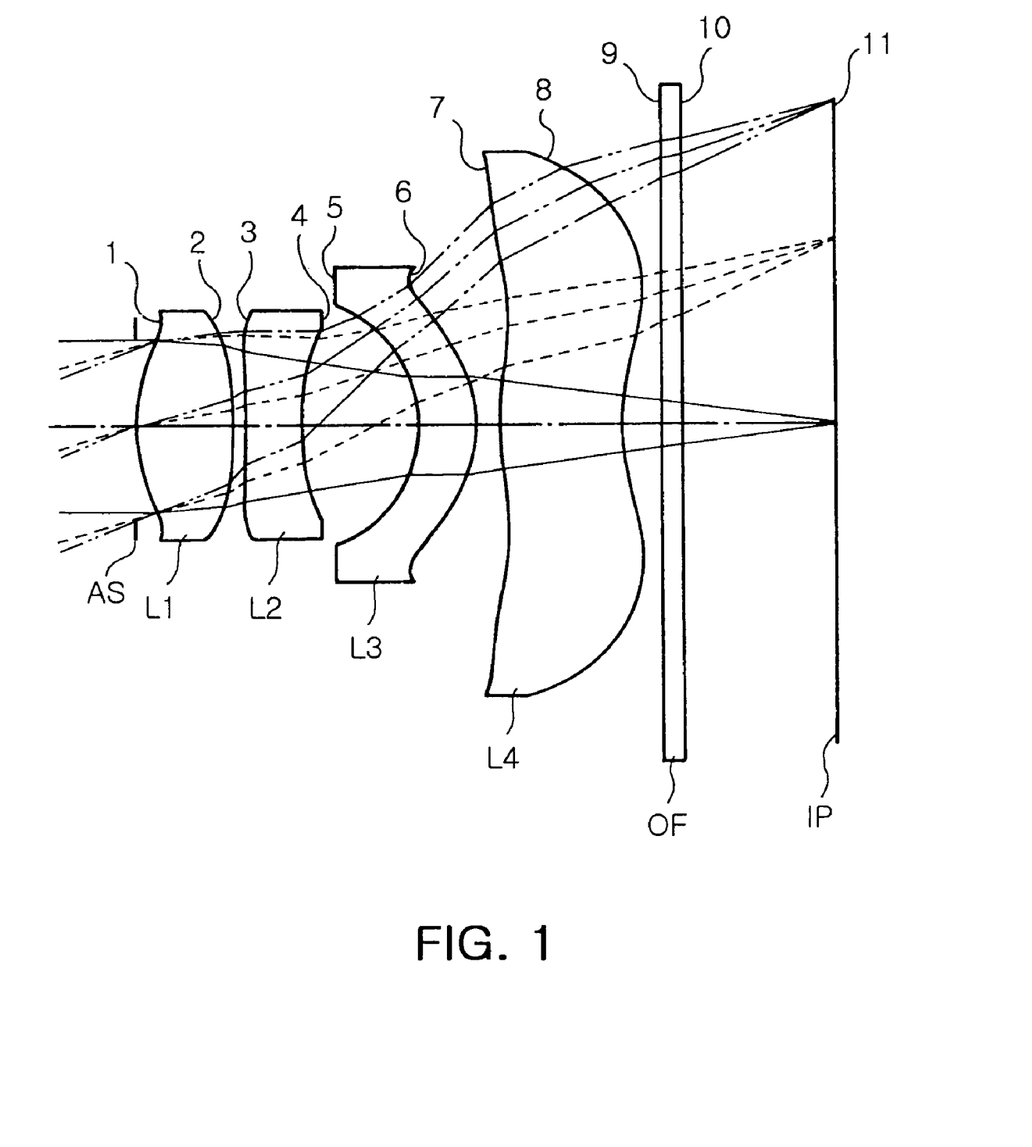
FIG. 1 is a lens configuration view illustrating a subminiature imaging optical system according to a first embodiment of the invention.

FIG. 1 is a lens configuration view illustrating a subminiature imaging optical system according to a first embodiment of the invention. In the following lens configuration views, the thicknesses, sizes and shapes of the lenses may be exaggerated for clarity. In particular, the shapes of spherical or aspherical surfaces shown in the views are only exemplary and should not be construed as limiting.

As shown in FIG. 1, the subminiature imaging optical system includes a first lens L1 having positive refractive power and both convex surfaces, a second lens L2 having negative refractive power and a concave image-side surface, a third lens L3 having negative refractive power and a meniscus shape with a convex image-side surface, and a fourth lens L4 having negative refractive power. Also, an aperture stop AS is disposed at an object-side surface 1 of the first lens.

Meanwhile, an optical filter OF such as an infrared ray filter, a cover glass and the like may be provided between the fourth lens L4 and an image plane IP. Also, the image plane IP corresponds to an image sensor such as a charge coupled device (CCD) and a complementary metal oxide semiconductor (CMOS).

In the subminiature imaging optical system of the present invention, the first lens L1 with positive refractive power, the second lens L2 with strong negative refractive power and the third lens L3 with weak negative refractive power have Abbe numbers greatly different from one another to reduce chromatic aberration. That is, the first lens L1 employs a low-dispersion lens made of glass or plastic. Also, the second lens L2 and the third lens L3 are formed of a plastic, high-dispersion lens to effectively correct chromatic aberration.

Moreover, the first lens L1 and the second lens L2 have refractive power relatively greater than the third and fourth lenses L3 and L4. This allows the optical system to be reduced in size and optimized in radius of curvature of aspherical and refractive surfaces, respectively. This accordingly produces the optical system with superior aberrational characteristics and high resolution.

Particularly, aspherical lenses are adopted to enhance resolution of the lens and reduce distortion and spherical aberration, thereby realizing a compact optical system with excellent optical characteristics.

Furthermore, some of the lenses are formed of plastic and thus the aspherical lenses can be manufactured easily at a low cost.

In addition, a back focal length is sufficiently obtained to ensure the camera module to be easily manufactured.

With this overall configuration, operational effects of following conditions 1 to 11 will be examined hereunder.

Condition 1 governs refractive power of the first lens L1.

$0.5 < f1/f < 0.7$             condition 1, where f1 is a focal length of the first lens L1 and f is an effective focal length of an overall optical system.

f1 greater than an upper limit of condition 1 decreases refractive power of the first lens L1, and accordingly increases a total length. This hampers subminiaturization of the optical system, which is the feature of the present invention.

On the contrary, f1 smaller than a lower limit of condition 1 ensures decrease in size but renders aberrations hardly correctable.

Condition 2 governs a dimension of the overall optical system in an optical axis direction, as a pre-condition for miniaturization.

$1.0 < TL/f < 1.3$             condition 2, where TL is a distance from the object-side surface 1 of the first lens L1 to the image plane IP, and f is an effective focal length of the overall optical system.

Deviation from an upper limit of condition 2 ensures better aberrational corrections but increases a total length, thereby obstructing subminiaturization of the optical system, which is the feature of the present invention. Moreover, deviation from a lower limit of condition 2 shortens the total length too much to satisfy optical capabilities required for the optical system. This also increases manufacturing tolerance, thereby degrading performance of the optical system.

Condition 3 prescribes a shape of the first lens L1.

$0.35 < r1/f < 0.55$            condition 3, where r1 is a radius of curvature of the object-side surface 1 of the first lens L1 and f is an effective focal length of the overall optical system.

r1 greater than an upper limit of condition 3 decreases refractive power of the first lens L1, thereby hampering miniaturization thereof. This also causes spherical aberration significantly, rendering it hard to achieve high-quality image and causes distortion considerably. On the contrary, r1 smaller than a lower limit poses a difficulty to machinability and renders the optical system greatly susceptible to manufacturing tolerance and increases spherical aberration and chromatic aberration.

Conditions 4 to 6 prescribe correction of chromatic aberrations.

$$25 < v1-v2 < 40 \qquad \text{condition 4,}$$

$$25 < v1-v3 < 40 \qquad \text{condition 5,}$$

$$-5 < v3-v2 < 15 \qquad \text{condition 6,}$$

where v1 is an Abbe number of the first lens L1, v2 is an Abbe number of the second lens L2 and v3 is an Abbe number of the third lens L3.

Deviation from lower limits of conditions 4 and 5, respectively decreases differences in the Abbe numbers of the first, second and third lenses L1, L2 and L3, degrading chromatic aberration and thus rendered not applicable to a high-pixel imaging optical system. On the contrary, deviation from an upper limit of conditions 4 and 5 increases differences in the Abbe numbers of the first, second and third lenses L1, L2, and L3, thereby raising material costs for the lens.

Furthermore, to satisfy conditions 4 and 5, condition 6 defines a difference in the Abbe number between the second and third lenses L2 and L3 formed of a relatively higher-dispersion lens than the first lens L1. Deviation from an upper limit of condition 6 imparts positive refractive power to the third lens L3, thus departing from the scope of the present invention where the third lens L3 has negative refractive power. On the other hand, deviation from a lower limit of condition 6 causes the third lens L3 to have a much greater dispersion value than the second lens L2, thereby hardly correcting chromatic aberration.

Condition 7 governs refractive power of the third lens L3 having weak negative refractive power.

$$10 < |f3|/f \qquad \text{condition 7,}$$

where f3 is a focal length of the third lens L3 (f3<0) and f is an effective focal length of an overall optical system.

Deviation from a lower limit of condition 7 imparts positive refractive power to the fourth lens L4 to maintain an effective focal length of the entire optical system at an appropriate level. This however departs from the scope of the present invention.

Condition 8 prescribes a shape of the third lens L3.

$$0.2 < |r5|/f < 5 \qquad \text{condition 8,}$$

where r5 is a radius of curvature (r5<0) of the object-side surface 5 of the third lens L3, and f is an effective focal length of an overall optical system.

Deviation from an upper limit of condition 8 causes the second and third lenses L2 and L3 to be approximated to each other thereby to increase sensitivity to manufacturing tolerance. On the other hand, deviation from a lower limit of condition 8 renders distortion hardly correctable.

Condition 9 governs refractive power of the fourth lens L4.

$$2 < |f4|/f \qquad \text{condition 9,}$$

where f4 is a focal length of the fourth lens L4 (f4<0), and f is an effective focal length of an overall optical system.

Deviation from a lower limit of condition 9 causes the third lens L3 to have positive refractive power, thus departing from the scope of the present invention.

Condition 10 prescribes a shape of the object-side surface 7 of the fourth lens L4.

$$0.2 < |r7|/f < 0.7 \qquad \text{condition 10,}$$

where r7 is a radius of curvature of an object-side surface 7 of the fourth lens L4 and f is an effective focal length of an overall optical system.

Deviation from an upper limit of condition 10 does not ensure optical performance in a field near an axis. On the other hand, deviation from a lower limit of condition 10 renders it hard to form aspherical surfaces and causes an image formed in the field near the axis to be more susceptible to manufacturing tolerance of the fourth lens L4.

Condition 11 prescribes a shape of the image-side surface 8 of the fourth lens L4.

$$0.2 < r8/f < 25 \qquad \text{condition 11,}$$

where r8 is a radius of curvature of an image-side surface 8 of the fourth lens L4 and f is an effective focal length of an overall optical system.

Deviation from upper and lower limits of condition 11 causes the fourth lens L4 to be hardly matched with the image sensor, thereby reducing a peripheral light amount. Moreover, deviation from the lower limit of condition 11 poses a difficulty to machinability and renders the optical system greatly susceptible to manufacturing tolerance, thereby raising manufacturing costs of the lenses.

Now, the present invention will be examined in greater detail through specific numerical examples.

Figure 3:
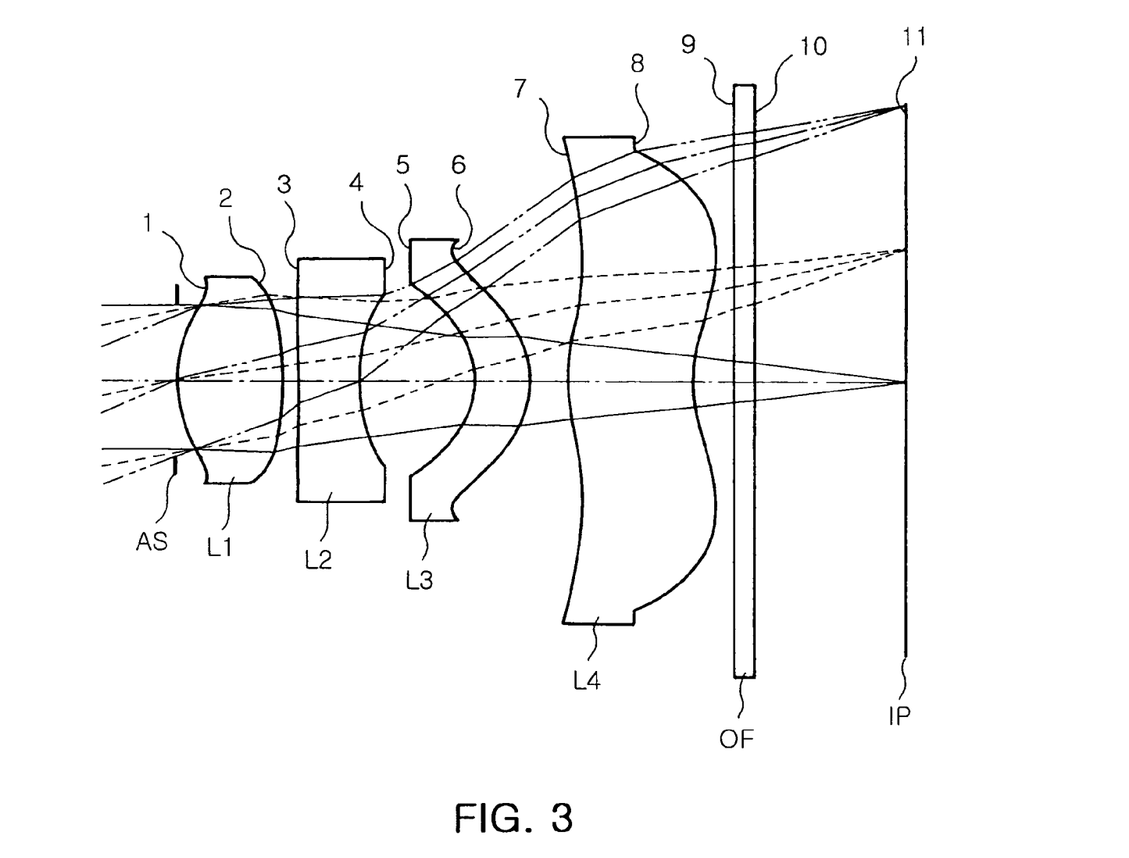
FIG. 3 is a lens configuration view illustrating a subminiature imaging optical system according to a second embodiment of the invention.
Figure 5:
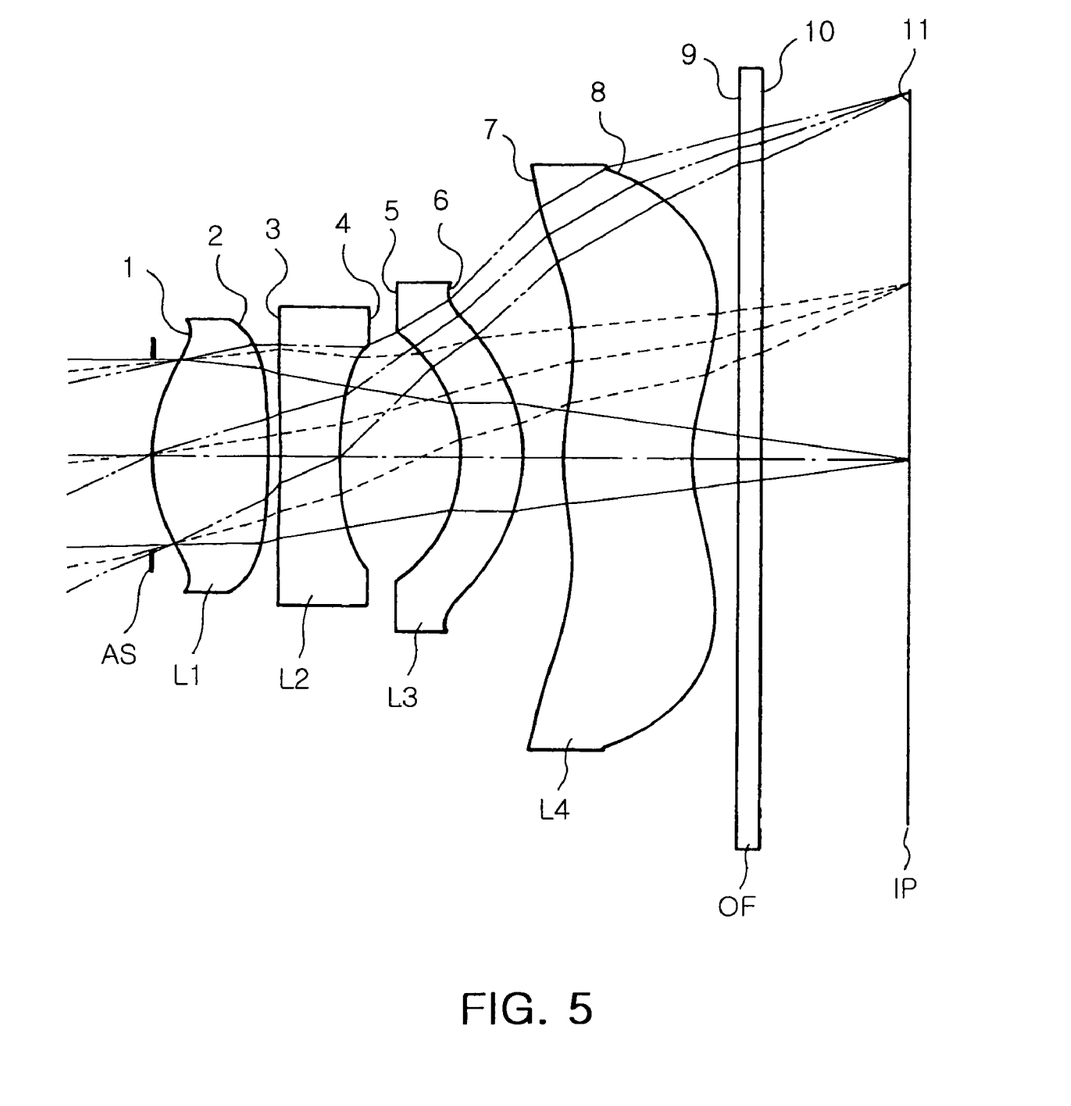
FIG. 5 is a lens configuration view illustrating a subminiature imaging optical system according to a third embodiment of the invention.

As described above, in the following first to third embodiments, a subminiature optical system includes, sequentially from an object side, a first lens L1 having positive refractive power and both convex surfaces, a second lens L2 having negative refractive power and a concave image-side surface, a third lens L3 having negative refractive power and a meniscus shape with a convex image-side surface, and a fourth lens L4 having negative refractive power. Also, an aperture stop AS is disposed at an object-side surface 1 of the first lens. Also, an optical filter OF such as an infrared ray filter, a cover glass and the like may be provided between the fourth lens L4 and an image plane IP. Here, the image plane IP corresponds to an image sensor such as a charge coupled device (CCD) and a complementary metal oxide semiconductor (CMOS).

Each of the aspherical surfaces used in each of the embodiments herein is obtained from following Equation 1:

$$Z = \frac{cY^2}{1+\sqrt{1-(1+K)c^2Y^2}} + AY^4 + BY^6 + CY^8 + DY^{10} + EY^{12} + FY^{14} + \ldots, \qquad \text{Equation 1}$$

where Z is a distance from a vertex of a lens in an optical axis, Y is a distance in a direction perpendicular to the optical axis, C is a reciprocal number of a radius r of curvature at a vertex of the lens, K is a conic constant and A, B, C, D, E and F are aspherical coefficients.

First Embodiment

Table 1 below shows numerical values of a subminiature optical system according to a first embodiment of the present invention.

FIG. 1 is a view illustrating a lens arrangement of the subminiature imaging optical system according to the first embodiment of the present invention, and FIGS. 2A to 2C show aberrations of the optical system shown in Table 1 and FIG. 1. In the following diagrams showing astigmatism, "S" represents sagital and "T" represents tangential.

In the first embodiment, an F number Fno is 2.8, a length TL from the object-side surface 1 of the first lens L1 to the image plane IP is 5.07 mm, an effective focal length f is 4.5273 mm, and a back focal length BFL is 1.1048 mm. Also, a focal length f1 of the first lens is 2.58 mm, a focal length f2 of the second lens is −4.96 mm, a focal length f3 of the third lens is −206.12 mm and a focal length f4 of the fourth lens is −26.57 mm.

TABLE 1

| Surface No. | Radius of curvature R | Thickness or distance t | Refractive index Nd | Abbe number Vd |
|---|---|---|---|---|
| *1 | 1.878 | 0.700 | 1.583 | 59.5 |
| *2 | −6.551 | 0.100 | | |
| *3 | −10.613 | 0.400 | 1.614 | 25.6 |
| *4 | 4.335 | 0.840 | | |
| *5 | −1.303 | 0.420 | 1.614 | 25.6 |
| *6 | −1.475 | 0.170 | | |
| *7 | 2.690 | 0.900 | 1.544 | 56.1 |
| *8 | 2.001 | 0.300 | | |
| 9 | ∞ | 0.145 | 1.517 | 64.2 |
| 10 | ∞ | 1.095 | | |
| 11 | ∞ | | | |

In Table 1, * represents an aspherical surface, and in the first embodiment, the object-side surface 1 and image-side surface 2 of the first lens L1, the object-side surface 3 and image-side surface 4 of the second lens L2, the object-side surface 5 and image-side surface 6 of the third lens L3, and the object-side surface 7 and image-side surface 8 of the fourth lens are aspherical.

Values of aspherical coefficients in the first embodiment according to Equation 1 are noted in Table 2 below.

Second Embodiment

Table 3 below shows numerical values of a subminiature imaging optical system according to a second embodiment of the present invention. FIG. 1 is a view illustrating a lens arrangement of the subminiature imaging optical system according to the second embodiment of the present invention, and FIGS. 4A to 4C show aberrations of the optical system shown in Table 3 and FIG. 3.

In the second embodiment, an F number Fno is 2.8, a length TL from the object-side surface 1 of the first lens L1 to the image plane IP is 5.25 mm, an effective focal length f is 4.561 mm, and a back focal length BFL is 1.1567 mm. Also, a focal length f1 of the first lens is 2.85 mm, a focal length f2 of the second lens is −5.32 mm, a focal length f3 of the third lens is −1000628 mm and a focal length f4 of the fourth lens is −3193 mm.

TABLE 3

| Surface No. | Radius of curvature R | Thickness or distance t | Refractive index Nd | Abbe number Vd |
|---|---|---|---|---|
| *1 | 1.913 | 0.738 | 1.583 | 59.5 |
| *2 | −7.779 | 0.126 | | |
| *3 | −15.973 | 0.440 | 1.614 | 25.6 |
| *4 | 3.659 | 0.825 | | |
| *5 | −1.265 | 0.400 | 1.614 | 25.6 |
| *6 | −1.441 | 0.282 | | |
| *7 | 2.481 | 0.900 | 1.544 | 56.1 |
| *8 | 2.093 | 0.300 | | |
| 9 | ∞ | 0.145 | 1.517 | 64.2 |
| 10 | ∞ | 1.093 | | |
| 11 | ∞ | | | |

In Table 3, * represents an aspherical surface, and in the second embodiment, the object-side surface 1 and image-side surface 2 of the first lens L1, the object-side surface 3 and image-side surface 4 of the second lens L2, the object-side surface 5 and image-side surface 6 of the third lens L3, and the object-side surface 7 and image-side surface 8 of the fourth lens are aspherical.

Values of aspherical coefficients in the second embodiment according to Equation 1 are noted in Table 4 below.

TABLE 2

| Surface No. | K | A | B | C | D | E | F |
|---|---|---|---|---|---|---|---|
| *1 | −1.7840E+00 | 1.8251E−03 | −1.2618E−02 | −6.5211E−02 | 4.3236E−02 | −3.5150E−02 | |
| *2 | 2.0506E+01 | −3.4898E−02 | −7.2110E−02 | −6.6523E−03 | 9.2343E−02 | −5.7511E−02 | |
| *3 | 0.0000E+00 | 6.3988E−02 | −9.3312E−02 | 4.4775E−02 | 1.3317E−01 | −7.6230E−02 | |
| *4 | 1.7235E+01 | 7.7353E−02 | −6.3338E−02 | 5.8386E−03 | 3.8186E−02 | −1.6348E−02 | |
| *5 | −5.9252E+00 | −1.3951E−01 | 6.9603E−03 | −6.2959E−02 | 1.0194E−01 | −7.6569E−02 | |
| *6 | −7.4952E−01 | 1.8470E−02 | −2.3288E−02 | 1.7085E−02 | 2.4510E−03 | 7.2954E−05 | |
| *7 | −2.3215E+01 | −8.8328E−02 | 3.0437E−02 | −4.9281E−03 | 4.0738E−04 | −1.2326E−05 | −3.9335E−07 |
| *8 | −1.0372E+01 | −5.4217E−02 | 1.1467E−02 | −2.4241E−03 | 2.6660E−04 | −1.1931E−05 | −3.9225E−07 |

TABLE 4

| Surface No. | K | A | B | C | D | E | F |
|---|---|---|---|---|---|---|---|
| *1 | −1.5459E+00 | 5.9001E−03 | −5.6017E−03 | −5.7285E−02 | 5.6003E−02 | −4.0409E−02 | |
| *2 | 2.9175E+01 | −1.6483E−02 | −6.9277E−02 | −1.8455E−02 | 8.7343E−02 | −5.1089E−02 | |

TABLE 4-continued

| Surface No. | K | A | B | C | D | E | F |
|---|---|---|---|---|---|---|---|
| *3 | 0.0000E+00 | 5.5321E−02 | −9.8809E−02 | 2.9783E−02 | 1.1139E−01 | −6.2406E−02 | |
| *4 | 9.2227E+00 | 6.4178E−02 | −5.2828E−02 | 3.1329E−03 | 3.8668E−02 | −1.0277E−02 | |
| *5 | −4.5952E+00 | −1.3749E−01 | 1.0205E−02 | −6.9736E−02 | 9.8589E−02 | −5.5148E−02 | |
| *6 | −6.2746E−01 | 1.3491E−02 | −2.9906E−02 | 1.9449E−02 | 4.3265E−03 | −8.3263E−04 | |
| *7 | −1.0134E+01 | −8.1964E−02 | 2.8610E−02 | −5.0813E−03 | 4.2044E−04 | −6.6546E−06 | −6.8134E−07 |
| *8 | −7.9722E+00 | −5.1676E−02 | 1.0556E−02 | −2.1257E−03 | 2.5024E−04 | −1.4743E−05 | −3.1561E−08 |

Third Embodiment

Table 5 below shows numerical values of a subminiature imaging optical system according to a third embodiment of the present invention. FIG. 5 is a view illustrating a lens arrangement of the subminiature imaging optical system according to the third embodiment of the present invention, and FIGS. 6A to 6C show aberrations of the optical system shown in Table 5 and FIG. 5.

In the third embodiment, an F number Fno is 2.8, a length TL from the object-side surface 1 of the first lens L1 to the image plane IP is 4.87 mm, an effective focal length f is 4.3827 mm, and a back focal length BFL is 0.9694 mm. Also, a focal length f1 of the first lens is 2.55 mm, a focal length f2 of the second lens is −5.06 mm, a focal length f3 of the third lens is −501238 mm and a focal length f4 of the fourth lens is −18.67 mm.

TABLE 5

| Surface No. | Radius of curvature R | Thickness or distance t | Refractive index Nd | Abbe number Vd |
|---|---|---|---|---|
| *1 | 1.680 | 0.747 | 1.571 | 63.1 |
| *2 | −9.360 | 0.080 | | |
| *3 | −10.978 | 0.380 | 1.614 | 25.6 |
| *4 | 4.397 | 0.774 | | |
| *5 | −1.464 | 0.400 | 1.744 | 28.0 |
| *6 | −1.635 | 0.265 | | |
| *7 | 2.649 | 0.835 | 1.544 | 56.1 |
| *8 | 1.868 | 0.300 | | |
| 9 | ∞ | 0.145 | 1.517 | 64.2 |
| 10 | ∞ | 0.945 | | |
| 11 | ∞ | | | |

In Table 5, * represents an aspherical surface, and in the third embodiment, the object-side surface 1 and image-side surface 2 of the first lens L1, the object-side surface 3 and image-side surface 4 of the second lens L2, the object-side surface 5 and image-side surface 6 of the third lens L3, and the object-side surface 7 and image-side surface 8 of the fourth lens are aspherical.

Values of aspherical coefficients in the third embodiment according to Equation 1 are noted in Table 6 below.

Figure 2:
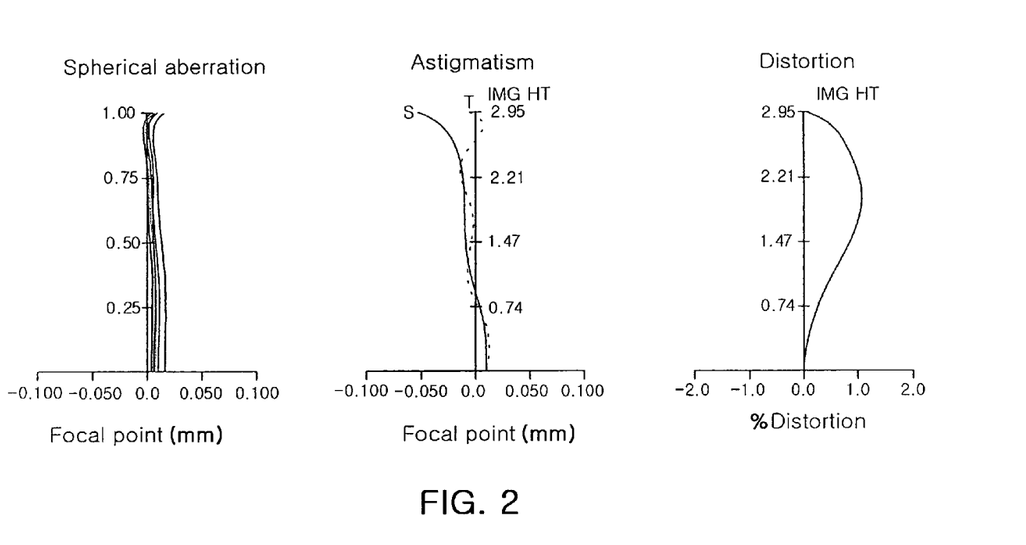
FIG. 2 is an aberrational diagram illustrating the embodiment shown in FIG. 1, in which A represents spherical aberration, B represents astigmatism and C represents distortion.
Figure 4:
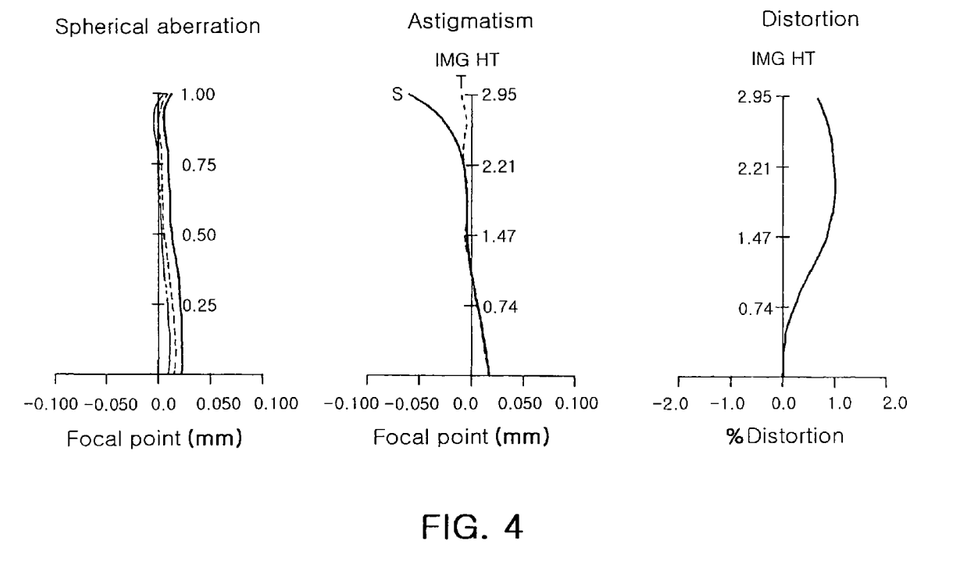
FIG. 4 is an aberrational diagram illustrating the embodiment shown in FIG. 3, in which A represents spherical aberration, B represents astigmatism and C represents distortion.
Figure 6:
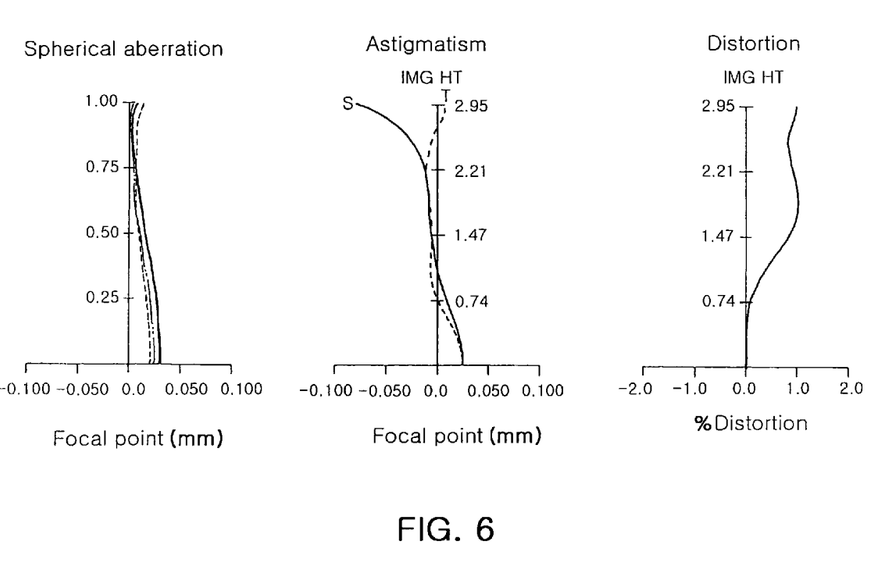
FIG. 6 is an aberration diagram illustrating the embodiment shown in FIG. 7, in which A represents spherical aberration, B represents astigmatism and C represents distortion.

As can be seen from the above embodiments, the subminiature imaging optical system with excellent aberrational characteristics as shown in FIGS. 2, 4 and 6 is obtained according to the present invention.

In the meantime, values of conditions 1 to 11 for the above first to third embodiments are noted in Table 7.

TABLE 7

| | First embodiment | Second embodiment | Third embodiment |
|---|---|---|---|
| Condition 1 | 0.570 | 0.625 | 0.583 |
| Condition 2 | 1.120 | 1.151 | 1.111 |
| Condition 3 | 0.415 | 0.420 | 0.383 |
| Condition 4 | 33.9 | 33.9 | 37.5 |
| Condition 5 | 33.9 | 33.9 | 35.1 |
| Condition 6 | 0 | 0 | 2.4 |
| Condition 7 | 57.457 | 219388 | 114367 |
| Condition 8 | 0.288 | 0.277 | 0.334 |
| Condition 9 | 5.868 | 700.166 | 4.261 |
| Condition 10 | 0.594 | 0.544 | 0.605 |
| Condition 11 | 0.442 | 0.459 | 0.426 |

As can be seen in Table 7 above, the first to third embodiments of the present invention satisfy conditions 1 to 11.

As set forth above, according to exemplary embodiments of the invention, a subminiature imaging optical system is suitably applicable to a subminiature optical instrument such as a mobile phone camera and a personal computer camera utilizing an image sensor such as a CCD or a CMOS. Particularly, the imaging optical system is shortened in total length but has a sufficient back focal length, and thus can be reduced in size and easily manufactured as a module.

Also, the first lens is formed of a low-dispersion lens and the second and third lenses are formed of a high-dispersion lens to effectively correct chromatic aberration.

Furthermore, the lenses have respective refractive surfaces adjusted in radius of curvature and have aspherical surfaces formed thereon. This minimizes various aberrations and produces an image with high definition and high resolution.

In addition, a number of plastic lenses are employed to easily manufacture a lighter subminiature imaging optical device in mass production at a lower cost.

TABLE 6

| Surface No. | K | A | B | C | D | E | F |
|---|---|---|---|---|---|---|---|
| *1 | −1.2067E+00 | 1.1834E−02 | −4.7335E−03 | −5.1405E−02 | 5.4802E−02 | −5.7717E−02 | |
| *2 | 1.5000E+01 | −3.1159E−02 | −7.1445E−02 | −1.6981E−02 | 8.6741E−02 | −6.2346E−02 | |
| *3 | 0.0000E+00 | 6.1932E−02 | −9.3989E−02 | 3.8195E−02 | 1.1157E−01 | −6.8592E−02 | |
| *4 | 1.0471E+01 | 9.3357E−02 | −3.4301E−02 | 8.9446E−03 | 3.6636E−02 | 1.1650E−02 | |
| *5 | −7.3288E+00 | −1.5810E−01 | 1.8967E−02 | −7.1613E−02 | 9.1624E−02 | −5.8993E−02 | |
| *6 | −5.5331E−01 | 9.1560E−03 | −2.9660E−02 | 1.5417E−02 | 3.1789E−03 | 9.3646E−04 | |
| *7 | −2.1780E+01 | −1.0012E−01 | 3.0636E−02 | −4.7768E−03 | 4.3308E−04 | −9.7167E−06 | −1.5359E−06 |
| *8 | −1.0059E+01 | −5.6743E−02 | 1.1709E−02 | −2.7393E−03 | 3.0524E−04 | −1.0380E−05 | −1.1672E−06 |

While the present invention has been shown and described in connection with the exemplary embodiments, it will be apparent to those skilled in the art that modifications and variations can be made without departing from the spirit and scope of the invention as defined by the appended claims.

The invention claimed is:

1. A subminiature imaging optical system comprising:
   a first lens having positive refractive power and both convex surfaces;
   a second lens having negative refractive power and a concave image-side surface;
   a third lens having negative refractive power and a meniscus shape with a convex image-side surface; and
   a fourth lens having negative refractive power,
   wherein the first lens has refractive power satisfying following condition 1 and has a dimension in an optical direction satisfying following condition 2, $$0.5 < f1/f < 0.7 \quad \text{condition 1,}$$

$$1.0 < TL/f < 1.3 \quad \text{condition 2,}$$

where f1 is a focal length of the first lens, f is an effective focal length of an overall optical system and TL is a distance from an object-side surface of the first lens to an image plane.

2. The subminiature imaging optical system of claim 1, wherein the first lens has the object-side surface shaped to satisfy following condition 3, $$0.35 < r1/f < 0.55 \quad \text{condition 3,}$$

where r1 is a radius of curvature of the object-side surface of the first lens.

3. The subminiature imaging optical system of claim 1, wherein the first lens is formed of one of glass and plastic, and the second to fourth lenses are formed of plastic.

4. The subminiature imaging optical system of claim 1, wherein each of the first to third lenses has at least one refractive surface formed of an aspherical surface.

5. A subminiature imaging optical system comprising:
   a first lens having positive refractive power and both convex surfaces;
   a second lens having negative refractive power and a concave image-side surface;
   a third lens having negative refractive power and a meniscus shape with a convex image-side surface; and
   a fourth lens having a negative refractive power
   wherein the first to third lenses have respective Abbe numbers satisfying following conditions 1 to 3, $$25 < v1-v2 < 40 \quad \text{condition 1,}$$

$$25 < v1-v3 < 40 \quad \text{condition 2,}$$

$$-5 < v3-v2 < 15 \quad \text{condition 3,}$$

where v1 is the Abbe number of the first lens, v2 is the Abbe number of the second lens and v3 is an Abbe number of the third lens.

6. The subminiature imaging optical system of claim 5, wherein the third lens has refractive power satisfying following condition 4 and has an object-side surface shaped to satisfy following condition 5, $$10 < |f3|/f \quad \text{condition 4,}$$

$$0.2 < |r5|/f < 5 \quad \text{condition 5,}$$

where f3 is a focal length of the third lens (f3<0), and r5 is a radius of curvature of the object-side surface of the third lens (r5<0).

7. The subminiature imaging optical system of claim 5, wherein the fourth lens has refractive power satisfying following condition 6, and has an object-side surface of the fourth lens shaped to satisfy following condition 7, and an image-side surface shaped to satisfy following condition 8, $$2 < |f4|/f \quad \text{condition 6,}$$

$$0.2 < |r7|/f < 0.7 \quad \text{condition 7,}$$

$$0.2 < r8/f < 25 \quad \text{condition 8,}$$

where f4 is a focal length of the fourth lens (f4<0), r7 is a radius of curvature of the object-side surface of the fourth lens, and r8 is a radius of curvature of the image-side surface of the fourth lens.

8. A subminiature imaging optical system comprising:
   a first lens having positive refractive power;
   a second lens having negative refractive power;
   a third lens having negative refractive power; and
   a fourth lens having negative refractive power,
   wherein the first lens has refractive power satisfying following condition 1 and a dimension in an optical axis direction satisfying following condition 2, has an object-side surface shaped to satisfy following condition 3, $$0.5 < f1/f < 0.7 \quad \text{condition 1,}$$

$$1.0 < TL/f < 1.3 \quad \text{condition 2,}$$

$$0.35 < r1/f < 0.55 \quad \text{condition 3,}$$

where f1 is a focal length of the first lens, f is an effective focal length of an overall optical system, and TL is a distance from the object-side surface of the first lens to an image plane.

9. The subminiature imaging optical system of claim 8, wherein the third lens has refractive power satisfying following condition 4, and has an object-side surface shaped to satisfy following condition 5, $$10 < |f3|/f \quad \text{condition 4,}$$

$$0.2 < |r5|/f < 5 \quad \text{condition 5,}$$

where f3 is a focal length of the third lens (f3<0), r5 is a radius of curvature of the object-side surface of the third lens (r5<0), and r1 is a radius of curvature of the object-side surface of the first lens.

10. The subminiature imaging optical system of claim 9, wherein the fourth lens has refractive power satisfying following condition 6, and has an object-side surface shaped to satisfy following condition 7 and an image-side surface shaped to satisfy following condition 8, $$2 < |f4|/f \quad \text{condition 6,}$$

$$0.2 < |r7|/f < 0.7 \quad \text{condition 7,}$$

$$0.2 < r8/f < 25 \quad \text{condition 8,}$$

where f4 is a focal length of the fourth lens (f4<0), r7 is a radius of curvature of the object-side surface of the fourth lens, and r8 is a radius of curvature of the image-side surface of the fourth lens.

11. The subminiature imaging optical system of claim 8, wherein the fourth lens has refractive power satisfying following condition 6, and has an object-side surface shaped to satisfy following condition 7 and an image-side surface shaped to satisfy following condition 8, $$2 < |f4|/f \quad \text{condition 6,}$$

$$0.2 < |r7|/f < 0.7 \quad \text{condition 7,}$$

$0.2 < r8/f < 25$  condition 8, where f4 is a focal length of the fourth lens (f4<0), r7 is a radius of curvature of the object-side surface of the fourth lens, and r8 is a radius of curvature of the image-side surface of the fourth lens.

12. The subminiature imaging optical system of claim 8, wherein the first lens has both convex surfaces, the second lens has a concave image-side surface and the third lens has a meniscus shape with a convex image-side surface.

* * * * *